(12) United States Patent
Kandapallil et al.

(10) Patent No.: US 11,149,168 B2
(45) Date of Patent: Oct. 19, 2021

(54) SURFACE ACTIVATION FOR SEALANT ADHESION ON SURFACES

(71) Applicant: THE BOEING COMPANY, Chicago, IL (US)

(72) Inventors: Binil I. Kandapallil, Summerville, SC (US); Dion Paul Coleman, Issaquah, WA (US); Siji Thomas, Summerville, SC (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/460,699

(22) Filed: Jul. 2, 2019

(65) Prior Publication Data
US 2021/0002514 A1 Jan. 7, 2021

(51) Int. Cl.
*C09J 1/00* (2006.01)
*B05D 3/10* (2006.01)
*C09J 5/00* (2006.01)

(52) U.S. Cl.
CPC ............................. *C09J 1/00* (2013.01); *B05D 3/10* (2013.01); *C09J 5/00* (2013.01); *C09J 2400/12* (2013.01)

(58) Field of Classification Search
CPC ..................... C09J 1/00; B05D 3/10
See application file for complete search history.

(56) References Cited

U.S. PATENT DOCUMENTS

| 9,909,020 B2 | 3/2018 | Bateman et al. |
| 2006/0162769 A1 | 7/2006 | Palomares Gil et al. |
| 2007/0092735 A1 | 4/2007 | Bruner et al. |
| 2007/0218295 A1 | 9/2007 | Bateman et al. |
| 2008/0050598 A1* | 2/2008 | Bateman ............ C08J 7/14 428/426 |
| 2009/0208758 A1* | 8/2009 | D'Herbecourt ........ C09J 5/02 428/423.1 |
| 2015/0044381 A1* | 2/2015 | Park ................... G02B 1/10 427/385.5 |
| 2018/0265820 A1 | 9/2018 | Kandapallil et al. |

FOREIGN PATENT DOCUMENTS

| JP | S4841939 A | 6/1973 |
| JP | 2017132504 A | 8/2017 |
| WO | 2018158673 A1 | 9/2018 |

OTHER PUBLICATIONS

European Patent Office, Extended European Search Report for Application: 20182933.0-1103, dated Nov. 20, 2020.

* cited by examiner

*Primary Examiner* — Nathan T Leong
(74) *Attorney, Agent, or Firm* — Patterson + Sheridan, LLP (57) ABSTRACT

In at least one example, a composition for surface activation of an aerospace vehicle consists essentially of an organic solvent present in an amount from about 95 to about 99.5 volume percent, a transition metal alkoxide present in an amount from about 0.5 to about 5 volume percent, and a water content in an amount from about 0 to about 5 volume percent. In at least one example, a method of sealing a surface of an aerospace vehicle includes applying the composition to a surface of an aerospace vehicle. The composition applied to the surface is dried to form a transition metal oxide from the transition metal alkoxide. Excess of the transition metal oxide is removed from the surface. A sealant is applied over a remaining layer of the transition metal oxide on the surface.

21 Claims, 3 Drawing Sheets

SURFACE ACTIVATION FOR SEALANT ADHESION ON SURFACES

FIELD

Aspects generally relate to compositions and methods of using compositions.

BACKGROUND

Sealants are used on structures for a variety of industries for a variety of purposes, such as providing water-proofing, corrosion resistance, thermal and acoustic insulation, electrical and electro-magnetic insulation, fire-barrier protection, fuel sealing, aerosmoothing, or aesthetic appeal. Commercially available processes and adhesion promoters for applying a sealant to glossy topcoated metal substrates and bare carbon fiber reinforced polymer (CFRP) substrates are costly, time consuming to apply, pose health and safety concerns, and/or are ineffective. Commercially available processes and adhesion promoters require multiple separate steps of sanding of the surface, cleaning the sanded surface, applying an adhesion promoter over the cleaned surface, and applying a sealant over the activated surface.

In the case of glossy topcoated metal substrates and bare CFRP substrates, adhesion of the sealant is challenging due to the smooth surface of the glossy topcoated metal substrates or of the bare CFRP substrates. Therefore, the glossy topcoated surfaces and CFRP surfaces are sanded or abraded to create a rough texture in the topcoated surfaces and the CFRP surfaces. The roughened surfaces have increased surface area and dangling bonds for binding of an adhesion promoter. However, sanding of surfaces is difficult to perform over large surfaces, over curved surfaces, or over multi-faceted surfaces. Sanding of surfaces is also costly and time consuming to perform. Furthermore, sanding of surfaces poses environmental and health concerns. Due to particles generated during sanding, an operator typically wears a respirator mask during a sanding process.

Sanded glossy topcoated surfaces and sanded CFRP surfaces are cleaned to remove contaminants that spoil the sealant or inhibit physical or chemical bond formation with the surfaces. The cleaned glossy topcoated sanded surfaces and cleaned CFRP sanded surfaces are surface activated with an adhesion promoter in a separate step following the cleaning step. Commercially available adhesion promoters may require subsequent processes, such as curing of the adhesion promoter with heat and/or light for activation of the adhesion promoter. Insufficiently activated areas may cause adhesion failure of the sealant resulting in the need for rework, including repeating the entire sanding, cleaning, surface activation, and curing steps.

Figure 1:
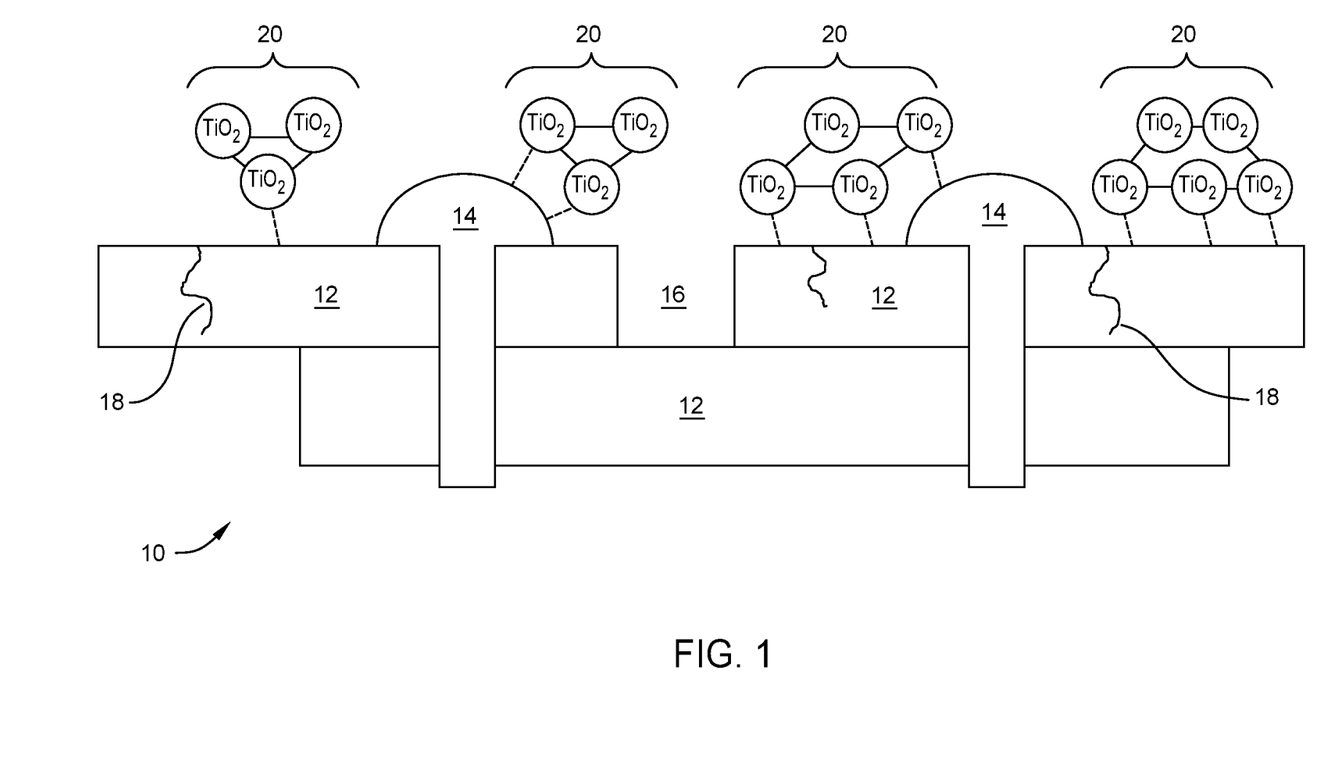
FIG. 1 is a schematic cross-sectional view of a vehicle surface activated with a suspension of a titanium dioxide adhesion promoter.

FIG. 1 is a schematic cross-sectional view of a vehicle surface 10 activated with a suspension of a titanium dioxide adhesion promoter 20. The vehicle surface 10 includes a plurality of panels 12 joined together with a plurality of rivets 14. The titanium dioxide adhesion promoter 20 is applied from a suspension of solid titanium dioxide particles of pre-determined size in a liquid. The titanium dioxide adhesion promoter 20 from a suspension tends to agglomerate. Agglomeration of the titanium dioxide adhesion promoter 20 results in poor coverage over the vehicle surface 10. The agglomerated titanium dioxide adhesion promoter 20 does not cover microcracks 18 or rivets 14 on the vehicle surface 10 due to the titanium dioxide adhesion promoter 20 adhering to itself rather than seeping into microcracks or adhering to rivets. The agglomerated titanium dioxide adhesion promoter 20 does not cover gaps formed between panels 12 since the gaps 16 cannot be sanded since the agglomerated titanium dioxide adhesion promoter 20 does not penetrate into the gaps.

Therefore, there is a need for improved compositions and methods of activating a glossy topcoated metal surface or a bare composite surface for application of a sealant.

SUMMARY

In one example, a composition for surface activation of an aerospace vehicle comprises an organic solvent present in an amount from about 95 to about 99.5 volume percent, a transition metal alkoxide present in an amount from about 0.5 to about 5 volume percent, and a water content in an amount from about 0 to about 5 volume percent.

In one example, a method of sealing a surface of an aerospace vehicle includes applying a composition to the surface. The composition includes an organic solvent present in an amount from about 95 to about 99.5 volume percent, transition metal alkoxide present in an amount from about 0.5 to about 5 volume percent, and a water content present in an amount from about 0 to about 5 volume percent. The composition applied to the surface is dried to form a transition metal oxide from the transition metal alkoxide. Excess of the transition metal oxide is removed from the surface. A sealant is applied over a remaining layer of the transition metal oxide on the surface.

In one example, a sealed surface of an aerospace vehicle includes a substrate having a surface roughness from about 1 microinch (μin) to about 500 microinch (μin) selected from a group consisting of a glossy topcoated metal substrate or a bare composite substrate. A monolayer or more of a transition metal oxide is adsorbed on a surface of the substrate. A sealant is adhered to the one or more monolayers of the transition metal oxide.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only exemplary aspects and are therefore not to be considered limiting of its scope, may admit to other equally effective aspects.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

Some aspects will now be described in greater detail below, including specific aspects, versions and examples, but the present disclosure is not limited to these aspects, versions or examples, which are included to enable a person having ordinary skill in the art to make and use aspects, when the information in the present disclosure is combined with available information and technology.

Various terms as used herein are defined below. To the extent a term used in a claim is not defined below, it should be given the broadest definition persons in the pertinent art have given that term as reflected in one or more printed publications or issued patents.

All documents described herein are incorporated by reference herein, including any priority documents and/or testing procedures to the extent they are not inconsistent with this text. As is apparent from the foregoing general description and the specific aspects, while forms of the aspects have been illustrated and described, various modifications can be made without departing from the spirit and scope of the present disclosure. Accordingly, it is not intended that the present disclosure be limited thereby. Likewise whenever a composition, an element or a group of elements is preceded with the transitional phrase "comprising," it is understood that we also contemplate the same composition or group of elements with transitional phrases "consisting essentially of," "consisting of," or "selected from the group of consisting of."

For the sake of brevity, only certain ranges are explicitly disclosed herein. However, ranges from any lower limit can be combined with any upper limit to recite a range not explicitly recited, as well as, ranges from any lower limit can be combined with any other lower limit to recite a range not explicitly recited, in the same way, ranges from any upper limit can be combined with any other upper limit to recite a range not explicitly recited. Additionally, within a range includes every point or individual value between its end points even though not explicitly recited. Thus, every point or individual value can serve as its own lower or upper limit combined with any other point or individual value or any other lower or upper limit, to recite a range not explicitly recited.

The present compositions and methods are related to sealing a surface of an aircraft, a spacecraft, or an aerospace vehicle (collectively referred to as an "aerospace vehicle"), such as a surface outside or within an aerospace vehicle. The surface can be a glossy topcoated metal surface, a bare composite surface, or other smooth surfaces. Bare composites are used in aircrafts for horizontal wing skins, horizontal tail skins, vertical tail skins, fuselage covers, avionic doors, and other aircraft components. In at least one method, an adhesion promoter based cleaning composition is used to clean and to activate a surface of an aerospace vehicle to promote adhesion of a sealant over the cleaned activated surface eliminating separate cleaning and adhesion promoting processes. A smooth surface of an aerospace vehicle is sealed without mechanical abrasion or chemical acid etching of the surface. A surface of an aerospace vehicle can be surface activated or sealed with reduced labor, with reduced time, with reduced cost, and/or with reduced environmental/health/safety concerns as compared to conventional processes. The adhesion promoter based cleaning composition can also be used to clean and promote adhesion of a sealant over any topcoated metal surface or bare composite surface other than an aerospace vehicle surface.

Figure 2:
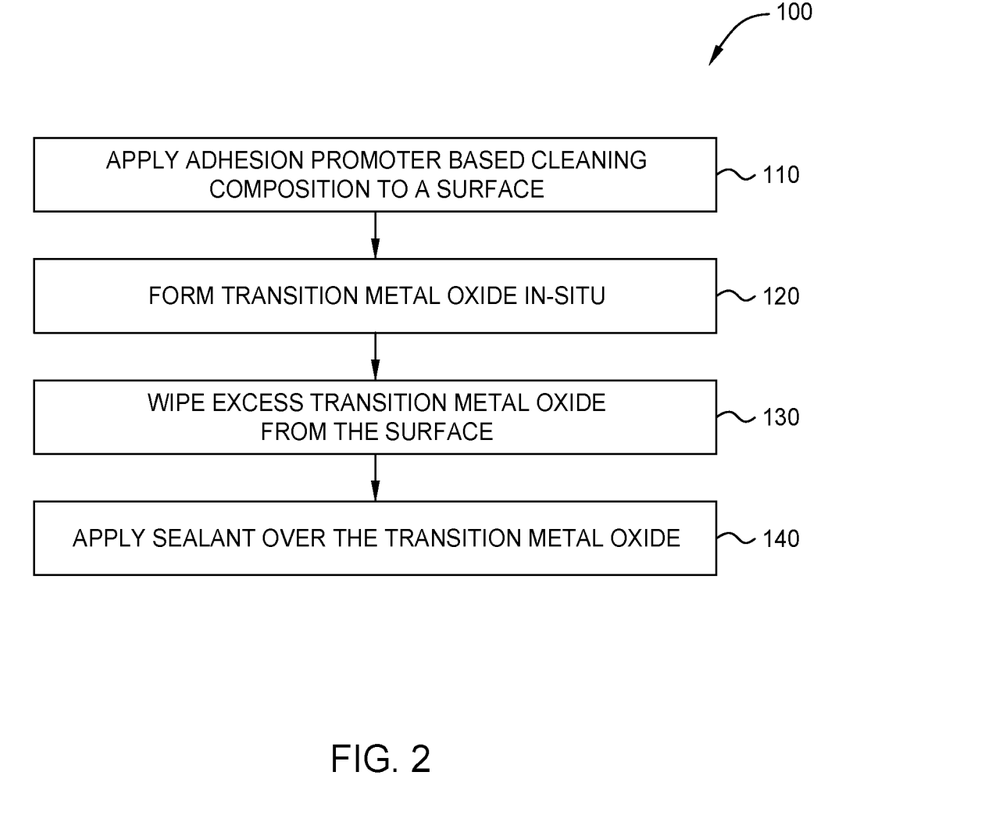
FIG. 2 is a schematic flow chart of a method of activating and/or sealing a surface of an aerospace vehicle.

FIG. 2 is a schematic flow chart of a method 100 of activating and/or sealing a surface of an aerospace vehicle. At block 110, an adhesion promoter based cleaning composition is applied to a non-textured surface to clean and to activate the surface. A non-textured surface is a surface with has not been sanded nor etched to increase the surface roughness. The adhesion promoter based cleaning composition includes an organic solvent and a transition metal alkoxide. In one aspect, the organic solvent acts as a cleaning agent removing contaminants that spoil the sealant/adhesion promoter or inhibit physical or chemical bond formation of the adhesion promoter/sealant with the substrate. In one or more aspects, the transition metal alkoxide is an adhesion promoter providing an interface between the surface and the sealant to affect an improved adhesion thereof.

The non-textured surface includes a substrate, such as a metal substrate, a polymer substrate, a composite substrate, or other suitable substrates. The metal substrate can be a bare aluminum substrate, an anodized aluminum substrate, a titanium substrate, a stainless steel substrate, a high strength steel substrate, or other suitable metal substrates. The metal substrates include a glossy topcoat formed thereover. Examples of glossy topcoats include polyurethane, epoxy, polyester, polycarbonate, acrylic, and polyester coatings. The glossy topcoats formed over the metal substrates can include or exclude intermediate or priming layers between the glossy topcoats and the metal substrates. An aluminum (bare or anodized) substrate with a glossy topcoat formed thereover is one example of a metal substrate used to manufacture aerospace vehicles. Polymer substrates comprise polyimide, polysulfide, plastic, elastomer, or other polymer materials. Composite surface can be a surface of a CFRP substrate, a glass fiber reinforced polymer substrate, an aramid fiber reinforced polymer substrate, a boron fiber reinforced polymer substrate, or other suitable fiber reinforced polymer/resin substrates. A CFRP substrate without any glossy topcoat is one example of a composite substrate used in the manufacture of aerospace vehicles. Other suitable substrates include substrates containing glass, wood, or fabric. The present adhesion promoter based cleaning composition can be directly applied to a bare composite substrate. In comparison, other adhesion promoters require a top coating over the bare composite substrate in which the adhesion promoters are applied to the top coated composite substrate.

The method 100 excludes mechanical abrading or chemical acid etching of the surface to retain a non-textured surface, a non-sanded, or a smooth surface of the aerospace vehicle. A substrate having a surface roughness of about 1 microinch (μin) to about 500 microinch (μin) indicates a non-textured, a non-sanded, or a smooth surface. The method 100 renders optional traditional mechanical abrasion by sanding of surfaces, such as glossy topcoated metal surfaces and bare composite surfaces, due to the uniform coverage and/or strength of the present adhesion promoter onto the unsanded surfaces. The sanding process is economically undesirable since sanding adds to manufacture time and is environmentally undesirable since sanding produces dust. Sanding is difficult to apply uniformly, especially over curved substrates, large substrates, or multifaceted substrates of an aerospace vehicle. Sanding is aesthetically undesirable since sanding alters or shifts the color of the surface. Sanding typically cannot be used on special effect topcoats containing micas or metallic particles.

The organic solvent of the adhesion promoter based cleaning composition comprises one or a blend of volatile organic solvents, including but not limited to, isopropyl alcohol (IPA), benzyl alcohol, butanol, methyl ethyl ketone (MEK), methyl n-propyl ketone (MPK), toluene, methyl isobutyl ketone (MIBK), acetone, DIESTONE DLS (a mixture of monopropylene glycol methyl ether, 2-methoxy 1-methylethyl acetate, $C_{9-11}$ n-alkanes, isoalkanes, cyclics with <2% aromatics), other solvents, and other co-solvents. In some aspects, the organic solvent is isopropyl alcohol (IPA), benzyl alcohol, or butanol due to their low cost and low environmental health and safety impact. Additional solvents are unnecessary to add to the composition to assist in the solubility of the adhesion promoter.

The transition metal of the transition metal alkoxide of the adhesion promoter based cleaning composition can be titanium or zirconium. The transition metal alkoxide can be a transition metal having an oxidation state of +4 with four of the same or independent alkoxide groups (—OR), including alkanoate groups (—OOR). For example, the transition metal alkoxide is represented by the formula $M(OR)_4$, in which each R independently represents the same or different alkyl group. Each alkyl group can comprise any number of carbon atoms, such as 20 carbon atoms or less, such as 10 carbon atoms or less, such as from 1 to 8 carbon atoms. In some examples, the transition metal alkoxide is a transition metal butoxide, a transition metal ethoxide, a transition metal ethylhexyloxide, a transition metal ethylhexanoate, or mixtures thereof. In other examples, the transition metal alkoxide is a titanium (IV) butoxide (TiB), a titanium (IV) ethoxide (TiE), a titanium (IV) ethylhexyloxide (TiEH), a titanium (IV) ethylhexanoate (TiEHO), or mixtures thereof. In certain aspects, the transition metal alkoxide is titanium (IV) ethoxide (TiE) due to its high adhesion to a variety of surfaces, such as over a polyurethane glossy enamel topcoated metal surface.

The method 100 combines what would typically be a two-step process, into a one step process in which the cleaning solvent and the adhesion promoter are combined into a single adhesion promoter based cleaning composition to provide an effective layer of adhesion promoter on a surface of an aerospace vehicle. The adhesion promoter based cleaning composition can be applied to a surface of an aerospace vehicle by brushing, rolling, dipping, drenching, or other suitable application of the composition. For example, brushing the composition includes utilizing a brush or a cleaning cloth (such as a cheese cloth, a wiper cloth, or a rag) to apply the composition over a surface of an aerospace vehicle. The adhesion promoter based cleaning composition cannot be sprayed with a spray gun due to the high volume percent of organic solvent of the adhesion promoter based cleaning composition. The high volume percent of organic solvent causes the composition to be flammable due to the low flash point of the organic solvent and unsuitable to be applied by spraying in a manufacturing setting.

The adhesion promoter based cleaning composition takes the form of a solution or an aerosol. The solution or aerosol of the adhesion promoter based cleaning composition spreads more easily over a surface of an aerospace vehicle in comparison to commercial adhesion promoters in the form of suspensions or pastes.

Application of an adhesion promoter based cleaning composition can remove or can reduce the amount of oils or other contaminants from a surface of an aerospace vehicle. For example, brushing or rolling the adhesion promoter can dissolve and/or entrain oils or contaminants onto the brush, cleaning cloth, rollers, etc. Application of an adhesion promoter based cleaning composition leaves a monolayer or more of a transition metal alkoxide over a surface of an aerospace vehicle.

At block 120, a transition metal oxide is formed in-situ over the surface of the aerospace vehicle. The transition metal oxide formed is a monolayer or more of solid transition metal oxide physically binding to the surface of the aerospace vehicle. The transition metal oxide provides a nanosurface that enhances the interface of the sealant to a surface of an aerospace vehicle, such as a glossy topcoated surface or a bare composite surface.

The organic solvent of the adhesion promoter based cleaning composition can be a volatile organic solvent which evaporates in ambient conditions to leave the transition metal alkoxide on the surface the aerospace vehicle. The term "ambient conditions" means that there is no heating by heat lamps or heating elements directed to the surface to evaporate the organic solvent. In one example, the organic solvent of the adhesion promoter based cleaning composition applied at block 110 includes an organic solvent with a vapor pressure at 20° C. of above 10 mm Hg or more to provide more rapid evaporation. In another example, the organic solvent of the adhesion promoter based cleaning solution can include an organic solvent with a vapor pressure at 20° C. of about 45 mm Hg or less to reduce excess organic solvent vapors. Excess organic solvent vapors may require ventilation or exhaust air flow to remove the excess organic solvent vapors. In still another example, the organic solvent of the adhesion promoter based cleaning solution include an organic solvent with a vapor pressure at 20° C. from about 10 mm Hg to about 45 mm Hg, such as isopropyl alcohol (IPA) which has a vapor pressure at 20° C. of about 33 mmHg or such as tert-butanol which has a vapor pressure at 20° C. of about 31 mmHg.

The transition metal alkoxide left on the surface the aerospace vehicle comprises a monolayer or more of the transition metal alkoxide over the surface. The transition metal alkoxide is hydrolysable. As the organic solvent evaporates, moisture in the air reacts with the transition metal alkoxide to form a transition metal oxide. For example, moisture in the air reacts with titanium alkoxide to form titanium dioxide in-situ, or moisture in the air reacts with zirconium alkoxide to form zirconium dioxide in-situ. Formation of metal oxide in-situ increases the uniform coverage of the transition metal oxide over the surface of the aerospace vehicle. In contrast to other commercially available adhesion promoters which contain titanium dioxide in a suspension, the transition metal oxide formed in-situ from the adhesion promoter based cleaning composition has reduced agglomeration and increased spreading. The transition metal alkoxide can be present in the adhesion promoter based cleaning composition applied at block 110 in an amount from about 0.5 to about 5 volume percent and the organic solvent can be present in an amount from about 95 to about 99.5 volume percent. The low ratio of transition metal alkoxide to organic solvent helps the spreading of the transition metal alkoxide when applied over the surface of the aerospace vehicle and helps to provide in-situ reactions of the transition metal alkoxide to transition metal oxide on the surface of the aerospace vehicle. A high ratio of transition metal alkoxide to organic solvent may cause undesirable agglomeration of the formed transition metal oxide. In comparison, commercially available titanium dioxide adhesion promoter suspensions have titanium dioxide formed ex situ which agglomerates or adheres to itself rather than on the surface of an aerospace vehicle.

Since transition metal oxide forms in-situ over the surface of the aerospace vehicle from moisture in the air, the organic solvent in the adhesion promoter based cleaning composition applied at block 110 can be an anhydrous solvent. The adhesion promoter based cleaning composition applied at block 110 comprises, consists essentially of, or consists of an organic solvent present in an amount from about 95 to about 99.5 volume percent, a transition metal alkoxide present in an amount from about 0.5 to about 5 volume percent, and a water content in an amount from about 0 to about 5 volume percent. In certain aspects, the water content of the adhesion promoter based cleaning composition is above 0 vol percent due to water absorption into the organic solvent.

Formation of a transition metal oxide in-situ over the surface of the aerospace vehicle can occur in a time from about 0.5 minutes to about 30 minutes after application in block 110. The time varies depending on how fast the organic solvent evaporations leaving the transition metal alkoxide to react with moisture in the air. Allowing the adhesion promoter based cleaning composition to dry over the surface of the aerospace vehicle in a time from about 0.5 minute to about 30 minutes is sufficient to proceed to block 130 to reduce the overall time to perform the method 100. However, allowing the adhesion promoter based cleaning composition to dry over the surface of the aerospace vehicle for longer than 30 minutes does not reduce the quality of activation of the surface.

The transition metal alkoxide by itself and/or the adhesion promoter based cleaning composition as a whole can be a colorless or a transparent solution. The adhesion promoter cleaning composition can provide a white solid color from the transition metal oxide layer formed in-situ as the organic solvent evaporates, such as white titanium dioxide or white zirconium dioxide. The white solid color of the transition metal oxide can be indicative of whether there is non-uniform application of the adhesion promoter based cleaning composition. The adhesion promoter based cleaning composition can be re-applied to areas of the surface of the aerospace vehicle with insufficient coverage. The adhesion promoter based cleaning composition can exclude dyes used as a tracking mechanism to track coverage of the composition since the white solid color of the transition metal oxide can indicate uniform coverage.

At block 130, excess transition metal oxide is wiped from the surface of the aerospace vehicle. The excess transition metal oxide can be wiped using a cheese cloth, a wiper cloth, a rag, or other suitable wiper. Excess transition metal oxide or loose particles of transition metal oxide over the surface of the aerospace vehicle is wiped from the surface leaving a monolayer or more, such as a thickness from about 200 nm to about 400 nm, of transition metal oxide with a strong physical adsorption over the surface. The wipe is a dry wipe to physically remove the excess or loose transition metal oxide. A wet water or wet solvent wipe is unnecessary. The transition metal oxide can penetrate into the topcoat of a glossy topcoated metal surface, such as into a glossy topcoated aluminum substrate.

Excess transition metal oxide can interfere with an adhesion of a sealant. The adhesion based cleaning composition provides a more uniform thin coverage of transition metal oxide in comparison to other adhesion promoters which have agglomerated transition metal oxide particles prone to adhesion failure. The adhesion based cleaning composition can exclude surfactants. In comparison, other commercially available adhesion promoters with titanium dioxide particles in suspension have surfactants to reduce agglomeration or precipitation of the titanium dioxide particles. These surfactants may adversely affect sealant adhesion.

The adhesion based cleaning composition can be low cost for one or more of factors. The adhesion based cleaning composition can comprise mainly of a low cost organic solvent, such as comprising about 95 or more volume percent of organic solvent. The adhesion based cleaning composition can have a low amount of relatively more expensive transition metal alkoxide in comparison to relatively less expensive organic solvent, such as comprising about 5 or less volume percent of transition metal alkoxide. The adhesion based cleaning composition can exclude dyes. The adhesion based cleaning composition can exclude surfactants.

At block 140, a sealant is applied over the transition metal oxide formed over the surface of the aerospace vehicle. The sealant physically and/or chemically binds to the transition metal oxide covered surface of the aerospace vehicle. Examples of sealants include, without limitation, polysulfides, polythioethers, polysilicones, polysiloxanes, epoxides, and polyurethanes. The sealants can provide leakage resistance, corrosion resistance, thermal and acoustic insulation, electrical and electro-magnetic insulation, fire-barrier protection, and/or aesthetic appeal. In certain aspects, the sealants provide leakage resistance and corrosion resistance from uniform coverage of the adhesion promoter over gaps, microcracks, cervices, pinholes, or imperfections of a surface of an aerospace vehicle.

The sealant adheres to the surface, such as a glossy topcoated metal substrate or a composite substrate, after treatment with the adhesion promoter based cleaning composition. These sealants exhibit high adhesive peel strength and low cohesive failure when pulled under a load machine. In one aspect, the sealant has a peel strength of about 20 or more pounds per inch of width (PIW), such as a peel strength of about 25 or more PIW, as measured by ASTM D3330 over a glossy topcoated metal surface, such as a glossy topcoated aluminum substrate, which has not been sanded or texture. In another aspect, the sealant has a peel strength of about 20 or more pounds per inch of width (PIW), such as a peel strength of about 25 or more PIW, as measured by ASTM D3330 over a composite surface, such as a CFRP substrate, which has not been sanded or texture.

The sealant can be non-transparent or transparent. The adhesion promoter based clean composition can be dye-free or can include a colored dye. For transparent sealants, the color of the transition metal oxide or colored dye of the adhesion promoter based cleaning composition can be seen through the transparent sealant.

Figure 3:
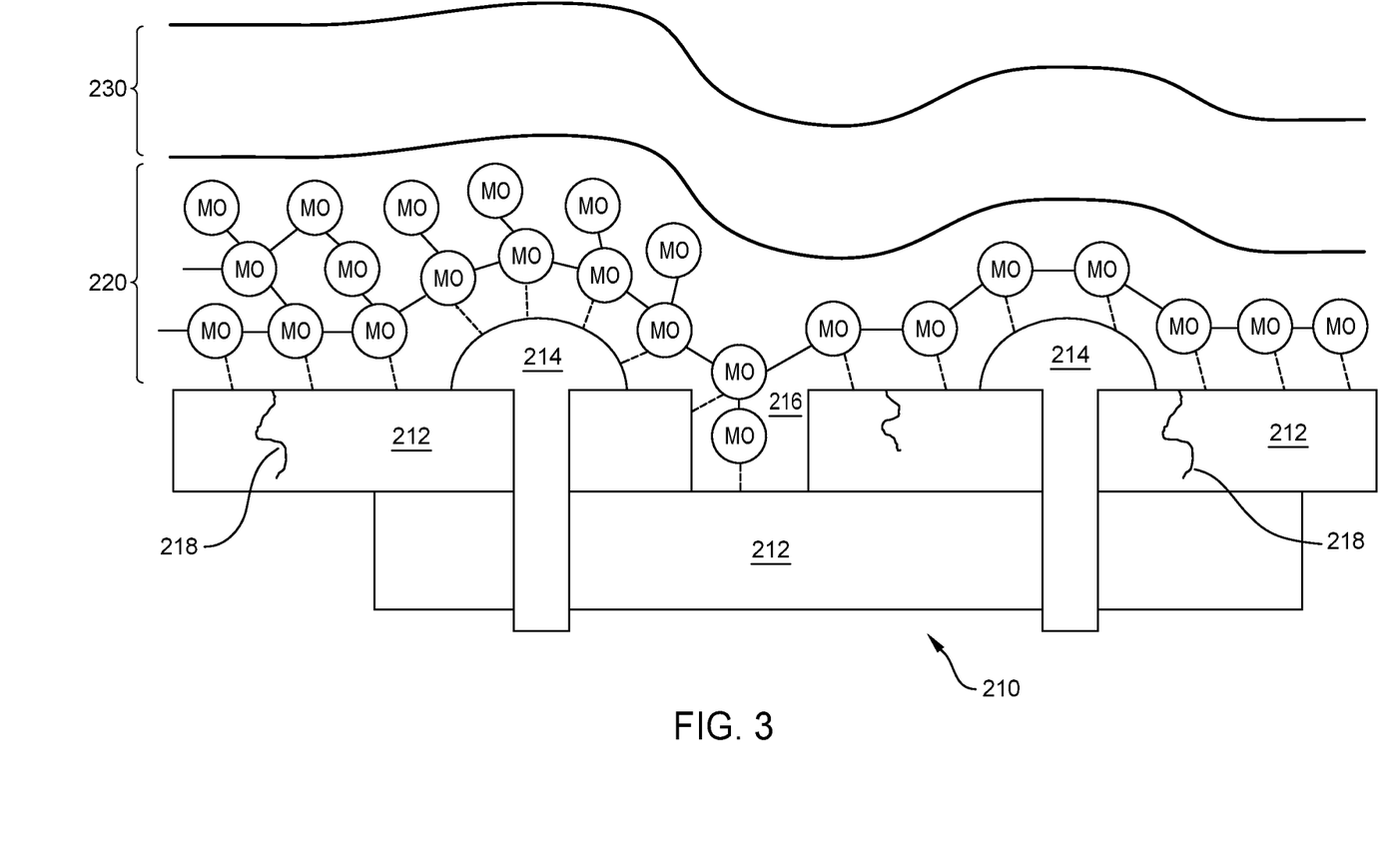
FIG. 3 is a schematic cross-sectional view of an aerospace vehicle surface activated with an adhesion promoter based cleaning composition with a transition metal oxide adhesion promoter formed in-situ from a transition metal alkoxide.

FIG. 3 is a schematic cross-sectional view of an aerospace vehicle surface 210 activated with an adhesion promoter based cleaning composition with a transition metal oxide adhesion promoter 220 formed in-situ from a transition metal alkoxide, such as the adhesion promoter based cleaning composition as described in reference to the method 100 of FIG. 2. As shown in FIG. 3, the aerospace vehicle surface 210 includes a plurality of panels 212 joined together with a plurality of rivets 214. The aerospace vehicle can be any surface of an aircraft, a spacecraft, or an aerospace vehicle (collectively referred to as an "aerospace vehicle"), including unmanned vehicles, rotary wing vehicles, missiles, or ballistic flight vehicles. The surface can be an exterior component or an interior component.

The transition metal oxide adhesion promoter 220, such as titanium dioxide, is applied from a transition metal alkoxide liquid with an organic solvent. The transition metal oxide adhesion promoter 220 forms to a thickness of a monolayer or more, such as a thickness from about 200 nm to 400 nm. Since the transition metal alkoxide is a liquid, the transition metal alkoxide more uniformly spreads over the aerospace vehicle surface 210 in comparison to a commercially available titanium dioxide suspension. Since the transition metal alkoxide does not agglomerate or precipitate out as a particle in an organic solvent, the transition metal alkoxide has increased coverage over gaps 216, between the panels 212, and over the rivets 214. Since the transition metal alkoxide forms transition metal oxide in-situ, the physical adsorption of the transition metal oxide formed in-situ onto the aerospace vehicle surface 210, such as over microcracks 218, crevices, imperfections, or pinholes on the surface, is stronger than the physical adsorption of titanium dioxide particles applied as a suspension. The transition metal alkoxide of the adhesion promoter based cleaning composition acts as a filler of microcracks, crevices, imperfections, or pinholes. No additional filler additive is necessary to be added to the adhesion promoter based cleaning composition.

A sealant applied over the transition metal oxide adhesion promoter 220 forms a sealant layer 230 over the aerospace vehicle surface 210. Since the transition metal oxide adhesion promoter 220 from the adhesion based promoter cleaning composition is formed more uniformly over microcracks, cervices, or imperfections on the aerospace vehicle surface 210, the sealant layer 230 forms more uniformly over the transition metal oxide adhesion promoter 220 and the aerospace vehicle surface 210. Thus, the sealant has increased corrosion resistance, leakage performance, fire resistance, and/or peel strength due to more uniform coverage over the aerospace vehicle surface.

Without being bound by theory, it is believed that transition metal alkoxide of the adhesion promoter based cleaning composition can interact with hydroxyl groups present on the surface of the aerospace vehicle surface 210, such as the hydroxyl groups of a glossy topcoat formed over a metal substrate or such as the hydroxyl groups from a composite substrate, forming a chemical adsorption of the transition metal oxide onto the aerospace vehicle surface.

The transition metal oxide has a strong chemical bond to the glossy topcoated surface of a metal substrate or to a bare surface of a composite substrate. A sealant layer 230 has a peel strength of about 20 or more pounds per inch of width (PIW), such as a peel strength of about 25 or more PIW, as measured by ASTM D3330 over a glossy topcoated metal surface, such as a glossy topcoated aluminum substrate, which has not been sanded or texture. In another aspect, the sealant has a peel strength of about 20 or more pounds per inch of width (PIW), such as a peel strength of about 25 or more PIW, as measured by ASTM D3330 over a bare composite surface, such as a CFRP substrate, which has not been sanded or texture.

Other adhesion promoters lack the peel strength of the sealant provided by the adhesion based promoter cleaning composition. Other adhesion promoters are directed to the aesthetic appearance of coatings, such as paint coatings, decorative coatings, or decals, over the adhesion promoters with visually reduced cracking or visually reduced peeling. Visually reduced cracking or visually reduced peeling is typically tested by an impact test of dropping a weight from a certain height to the specimen to see if there are visual cracks or visual peeling.

Peel strength tests are very different from impact tests. Peel strength tests are tensile measurements of the bond strength between the sealant and the glossy topcoated metal substrate or to a bare surface of a composite substrate provided by the transition metal oxide. A specimen that passes an impact test can have low or no peel strength when pulled or elongated from a tensile load.

The sealant layer 230 can be applied to functional areas of an aerospace vehicle. The sealant layer 230 can be applied to the wings and to the tails of an aircraft to prevent water corrosion. The wings and the tails experience high mechanical loads and stresses. Water corrosion to the wings and tail of an aircraft can cause mechanical failure of the aircraft. The sealant layer 230 can be applied to the fuel tanks of an aircraft to prevent fuel leakage. The fuel tanks can be in the wings, the fuselage, and/or the tail of the aircraft. Leakage of fuel can cause a fire or explosion of the aircraft. The sealant layer 230 can be applied to the engine compartment of an aircraft to reduce the spread of any flames from the engine compartment. In comparison, aesthetic coatings provide little or no function purpose to the aircraft.

The present compositions and methods are related to sealing a smooth surface of an aerospace vehicle, such as a glossy topcoated metal surface or a bare composite surface. The present adhesion promoter based cleaning compositions can be used to clean and to activate a smooth surface of an aerospace vehicle to promote adhesion of a sealant over the cleaned activated surface, eliminating separate cleaning and adhesion promoting steps. The smooth surface of an aerospace vehicle can be sealed without mechanical abrasion or chemical acid etching of the surface. The surface of an aerospace vehicle can be surface activated or sealed with reduced labor, with reduced time, with reduced cost, and/or with reduced environmental/health/safety concerns.

Aspects

The present disclosure provides, among others, the following aspects, each of which may be considered as optionally including any alternate aspects.

Clause 1. A composition for surface activation of an aerospace vehicle, comprising an organic solvent present in an amount from about 95 to about 99.5 volume percent, a transition metal alkoxide present in an amount from about 0.5 to about 5 volume percent, and a water content in an amount from about 0 to about 5 volume percent.

Clause 2. The composition according to any of clauses 1 and 3-5, wherein the transition metal alkoxide is selected from a group consisting of a titanium alkoxide, a zirconium alkoxide, or combinations thereof.

Clause 3. The composition according to any of clauses of 1, 2, 4, and 5, wherein the composition is in the form of a solution or an aerosol.

Clause 4. The composition according to any of clauses of 1-3, and 5, wherein the transition metal alkoxide is a transition metal butoxide, a transition metal ethoxide, a transition metal ethylhexyloxide, a transition metal ethylhexanoate, or combinations thereof.

Clause 5. The composition according to any of clauses 1-4, wherein the organic solvent has a vapor pressure from about 10 mmHg to about 45 mmHg at 20° C.

Clause 6. A method of sealing a surface of an aerospace vehicle, comprises applying a composition to the surface. The composition comprises an organic solvent present in an amount from about 95 to about 99.5 volume percent, a transition metal alkoxide present in an amount from about 0.5 to about 5 volume percent, and a water content present in an amount from about 0 to about 5 volume percent. The composition applied to the surface is dried to form a transition metal oxide. An excess of the transition metal oxide is removed from the surface. A sealant is applied over a remaining layer of the transition metal oxide on the surface.

Clause 7. The method according to any of clauses 6 and 8-14, wherein the surface is unsanded.

Clause 8. The method according to any of clauses 6, 7, and 9-14, wherein the surface is a glossy topcoated surface over an aluminum substrate.

Clause 9. The method according to any of clauses 6-8 and 10-14, wherein the surface is a bare surface of a composite substrate.

Clause 10. The method according to any of clauses 6-9 and 11-14, wherein the composition is applied to the surface in the form of a solution or an aerosol.

Clause 11. The method according to any of clauses 6-10 and 12-14, wherein the composition is dried for a time period from about 0.5 minutes to about 30 minutes.

Clause 12. The method according to any of clauses 6-11, 13, and 14, wherein the transition metal oxide is formed as the transition metal alkoxide is exposed to air as the organic solvent evaporates during drying of the composition.

Clause 13. The method according to any of clauses 6-12 and 14, wherein the excess of the transition metal oxide removed leaves a monolayer or more of the transition metal oxide adsorbed onto the surface.

Clause 14. The method according to any of clauses 6-13, wherein the organic solvent has a vapor pressure from about 10 mmHg to about 45 mmHg at 20° C.

Clause 15. A sealed surface of an aerospace vehicle, comprising a substrate having a surface roughness from about 1 microinch (μin) to about 500 microinch (μin) selected from a group consisting of a glossy topcoated metal substrate or a bare composite substrate, one or more monolayers of a transition metal oxide adsorbed on a surface of the substrate, and one or more sealants adhered to the one or more monolayers of the transition metal oxide.

Clause 16. The sealed surface according to any of clauses 15 and 17-20, wherein the sealant has peel strength of about 25 or more pounds per inch of width.

Clause 17. The sealed surface according to any of clauses 15, 16, and 18-20, wherein the transition metal oxide is selected from titanium dioxide or a zirconium dioxide.

Clause 18. The sealed surface according to any of clauses 15-17, 19, and 20, wherein the transition metal oxide is titanium dioxide.

Clause 19. The sealed surface according to any of clauses 15-18 and 20, wherein the sealant is selected from a group consisting of a polysulfide, a polythioether, a silicone, a polyurethane, and combinations thereof.

Clause 20. The sealed surface according to any of clauses 15-19, wherein the sealant is transparent and wherein the monolayer or more of the transition metal oxide is visibly uniformly covering the surface through the transparent sealant.

EXAMPLES

The following are examples to illustrate various aspects of a sealant over an adhesion promoter over a glossy topcoated metal surface or a bare composite surface. These examples are not meant to limit the scope of the claims unless specifically recited in the claims.

Example A

In examples 1-6, aluminum substrates were coated with an epoxy glossy enamel topcoat. None of the surfaces of the epoxy glossy enamel top coated substrates were sanded.

In examples 1-2, a sealant was directly applied to the glossy enamel topcoated surface.

In examples 3-4, the epoxy glossy enamel top coat was cleaned and surface activated with application of a single composition comprising an IPA organic solvent present in an amount from about 95 to about 99.5 volume percent and a titanium ethylhexanoate (TiEHO) present in an amount from about 0.5 to about 5 volume percent. The substrates were left to dry in ambient temperature and ambient air for about 30 minutes to form titanium dioxide over the epoxy glossy enamel topcoat. Excess titanium dioxide was wiped from the substrates. A sealant was applied over the titanium dioxide over the epoxy glossy enamel topcoated substrates.

In examples 5-6, the epoxy glossy enamel top coat was cleaned and surface activated with application of a single composition comprising an IPA organic solvent present in an amount from about 95 to about 99.5 volume percent and a titanium ethylhexyloxide (TiEH) present in an amount from about 0.5 to about 5 volume percent. The substrates were left to dry in ambient temperature and ambient air for about 30 minutes to form titanium dioxide over the epoxy glossy enamel topcoat. Excess titanium dioxide was wiped from the substrates. A sealant was applied over the titanium dioxide over the epoxy glossy enamel topcoated substrates.

The peel strength in pounds per inch widths (PIW) of the sealant onto the substrate was peel tested in accordance to ASTM D3330 and percentage of sealant adhesion failure during testing are shown in TABLE 1 below. Examples 1-2 without any adhesion promoter showed low sealant adhesion strength of 6.3 PIW or less with 60% or more adhesion failure. Examples 3-6 with TiEHO or TiEH adhesion promoters showed high adhesion strength of 29 PIW or more with 0% adhesion failure (100% cohesion).

TABLE 1

| Ex | Topcoat | Adhesion Promoter | Peel Strength | Adhesion Failure |
|---|---|---|---|---|
| 1 | epoxy glossy enamel | none | 6.3 | 70% |
| 2 | epoxy glossy enamel | none | 4.7 | 60% |
| 3 | epoxy glossy enamel | TiEHO | 29.30 | 0% |
| 4 | epoxy glossy enamel | TiEHO | 29.25 | 0% |
| 5 | epoxy glossy enamel | TiEH | 29.43 | 0% |
| 6 | epoxy glossy enamel | TiEH | 31.53 | 0% |

Example B

In examples 7-18, aluminum substrates were coated with a glossy polyester topcoat. None of the surfaces of the glossy polyester topcoated substrates were sanded.

In examples 7-8, a sealant was directly applied to the glossy polyester topcoated surface.

In examples 9-10, the glossy polyester topcoated surface was cleaned and surface activated with application of a single composition comprising an IPA organic solvent present in an amount from about 95 to about 99.5 volume percent and a titanium butoxide (TiB) present in an amount from about 0.5 to about 5 volume percent. The substrates were left to dry in ambient temperature and ambient air for about 30 minutes to form titanium dioxide over the glossy polyester topcoated surface. Excess titanium dioxide was wiped from the substrates. A sealant was applied over the titanium dioxide over the glossy polyester topcoated substrates.

In examples 11-14, the glossy polyester topcoated surface was cleaned and surface activated with application of a single composition comprising an IPA organic solvent present in an amount from about 95 to about 99.5 volume percent and a titanium ethoxide (TiE) present in an amount from about 0.5 to about 5 volume percent. The substrates were left to dry in ambient temperature and ambient air for about 30 minutes to form titanium dioxide over the glossy polyester topcoated surface. Excess titanium dioxide was wiped from the substrates. A sealant was applied over the titanium dioxide over the glossy polyester topcoated substrates.

In example 15, the glossy polyester topcoated surface was cleaned with an organic solvent. The cleaned glossy polyester topcoated surface was surface activated with Socogel™ TM A0203 sol-gel from Socomore located in Fort Worth, Tex. following the recommended directions for use from Socomore. A sealant was applied over the activated surface of the glossy polyester topcoated substrate.

In example 16, the glossy polyester topcoated surface was cleaned with an organic solvent. The cleaned glossy polyester topcoated surface was surface activated with AP86A Adhesion promoter from 3M located in St. Paul, Minn. following the recommended directions for use from 3M. A sealant was applied over the activated surface of the glossy polyester topcoated substrate.

In example 17, the glossy polyester topcoated surface was cleaned with an organic solvent. The cleaned glossy polyester topcoated surface was surface activated with AP596 Adhesion promoter from 3M located in St. Paul, Minn. following the recommended directions for use from 3M. A sealant was applied over the activated surface of the glossy polyester topcoated substrate.

In example 18, the glossy polyester topcoated surface was cleaned with an organic solvent. The cleaned glossy polyester topcoated surface was surface activated with PR-1826 from PPG located in Pittsburgh, Pa. following the recommended directions for use from PPG. A sealant was applied over the activated surface of the glossy polyester topcoated substrate.

The strength in pounds per inch widths (PIW) of the sealant onto the substrate was peel tested in accordance to ASTM D3330 and percentage of sealant adhesion failure during testing are shown in TABLE 2 below. Examples 7-8 without any adhesion promoter showed low sealant adhesion strength of 1.34 PIW or less with 100% adhesion failure. Examples 9-14 with TiB or TiE adhesion promoters showed high adhesion strength of 24 PIW or more with 0% adhesion failure (100% cohesion). Examples 15-18 with commercially available adhesion promoters showed low sealant adhesion strength of 12.7 PIW or less with 100% adhesion failure.

TABLE 2

| Ex | Topcoat | Adhesion Promoter | Peel Strength | Adhesion Failure |
|---|---|---|---|---|
| 7 | glossy polyester | none | 1.18 | 100% |
| 8 | glossy polyester | none | 1.34 | 100% |
| 9 | glossy polyester | TiB | 28.96 | 0% |
| 10 | glossy polyester | TiB | 30.12 | 0% |
| 11 | glossy polyester | TiE | 28.8 | 0% |
| 12 | glossy polyester | TiE | 24.8 | 0% |
| 13 | glossy polyester | TiE | 25.9 | 0% |
| 14 | glossy polyester | TiE | 28.2 | 0% |
| 15 | glossy polyester | Socogel | 0 | 100% |
| 16 | glossy polyester | AP86A | 0 | 100% |
| 17 | glossy polyester | AP596 | 12.7 | 100% |
| 18 | glossy polyester | PR-1826 | 0 | 100% |

Example C

In examples 19-29, aluminum substrates were coated with a polyurethane glossy enamel topcoat. None of the surfaces of the polyurethane glossy enamel topcoated substrates were sanded.

In examples 19-20, a sealant was directly applied to the polyurethane glossy enamel topcoated surface.

In examples 21-24, the polyurethane glossy enamel topcoated surface was cleaned and surface activated with application of a single composition comprising an IPA organic solvent present in an amount from about 95 to about 99.5 volume percent and a titanium ethoxide (TiE) present in an amount from about 0.5 to about 5 volume percent. The substrates were left to dry in ambient temperature and ambient air for about 30 minutes to form titanium dioxide over the glossy polyester topcoated surface. Excess titanium dioxide was wiped from the substrates. A sealant was applied over the titanium dioxide over the glossy polyester topcoated substrates.

In example 25, the polyurethane glossy enamel topcoated surface was cleaned with an organic solvent. The cleaned polyurethane glossy enamel topcoated surface was activated with Socogel™ sol-gel from Socomore located in Fort Worth, Tex. following the recommended directions for use from Socomore. A sealant was applied over the activated surface of the polyurethane glossy enamel topcoated substrate.

In example 26, the polyurethane glossy enamel topcoated surface was cleaned with an organic solvent. The cleaned polyurethane glossy enamel topcoated surface was surface activated with AP86A Adhesion promoter from 3M located in St. Paul, Minn. following the recommended directions for use from 3M. A sealant was applied over the activated surface of the polyurethane glossy enamel topcoated substrate.

In example 27, the polyurethane glossy enamel topcoated surface was cleaned with an organic solvent. The cleaned polyurethane glossy enamel topcoated surface was surface activated with Bondit A-43 promoter from Reltek located in Santa Rosa, Calif. following the recommended directions for use from Reltek. A sealant was applied over the activated surface of the polyurethane glossy enamel topcoated substrate.

In example 28, the polyurethane glossy enamel topcoated surface was cleaned with an organic solvent. The cleaned polyurethane glossy enamel topcoated surface was surface activated with AP596 Adhesion promoter from 3M located in St. Paul, Minn. following the recommended directions for use from 3M. A sealant was applied over the activated surface of the polyurethane glossy enamel topcoated substrate.

In examples 29, the glossy polyester topcoated surface was cleaned with an organic solvent. The cleaned polyurethane glossy enamel topcoated surface was surface activated with PR-1826 from PPG located in Pittsburgh, Pa. following the recommended directions for use from PPG. A sealant was applied over the activated surface of the polyurethane glossy enamel topcoated substrate.

The strength in pounds per inch widths (PIW) of the sealant onto the substrate was peel tested in accordance to ASTM D3330 and percentage of sealant adhesion failure during testing are shown in TABLE 3 below. Examples 19-20 without any adhesion promoter showed low sealant adhesion strength of 0 PIW with 100% adhesion failure. Examples 21-24 with TiE adhesion promoters showed high adhesion strength of 25 PIW or more with 0% adhesion failure. Examples 25-28 with commercially available adhesion promoters showed low sealant adhesion strength of 13.3 PIW or less with 65% or more adhesion failure.

TABLE 3

| Ex | Topcoat | Adhesion Promoter | Peel Strength | Adhesion Failure |
|---|---|---|---|---|
| 19 | polyurethane glossy enamel | none | 0 | 100% |
| 20 | polyurethane glossy enamel | none | 0 | 100% |

TABLE 3-continued

| Ex | Topcoat | Adhesion Promoter | Peel Strength | Adhesion Failure |
|---|---|---|---|---|
| 21 | polyurethane glossy enamel | TiE | 27.2 | 0% |
| 22 | polyurethane glossy enamel | TiE | 25.9 | 0% |
| 23 | polyurethane glossy enamel | TiE | 26.2 | 0% |
| 24 | polyurethane glossy enamel | TiE | 25.1 | 0% |
| 25 | polyurethane glossy enamel | Socogel | 0 | 100% |
| 26 | polyurethane glossy enamel | AP86A | 0 | 100% |
| 27 | polyurethane glossy enamel | Bondit A-43 | 13.3 | 65% |
| 28 | polyurethane glossy enamel | AP596 | 0 | 100% |
| 29 | polyurethane glossy enamel | PR-1826 | 0 | 0% |

Example D

In examples 30-35, CFRP substrates are provided without any topcoat. None of the surfaces of the CFRP substrates were sanded.

In examples 30-31, a sealant was directly applied to the CFRP surface.

In examples 32-33, the CFRP surface was cleaned and surface activated with application of a single composition comprising an IPA organic solvent present in an amount from about 95 to about 99.5 volume percent and a titanium butoxide (TiB) present in an amount from about 0.5 to about 5 volume percent. The substrates were left to dry in ambient temperature and ambient air for about 30 minutes to form titanium dioxide over the CFRP surface. Excess titanium dioxide was wiped from the substrates. A sealant was applied over the titanium dioxide over the CFRP substrates.

In examples 34-35, the CFRP surface was cleaned and surface activated with application of a single composition comprising an IPA organic solvent present in an amount from about 95 to about 99.5 volume percent and a titanium ethoxide (TiE) present in an amount from about 0.5 to about 5 volume percent. The substrates were left to dry in ambient temperature and ambient air for about 30 minutes to form titanium dioxide over the CFRP surface. Excess titanium dioxide was wiped from the substrates. A sealant was applied over the titanium dioxide over the CFRP substrates.

The strength in pounds per inch widths (PIW) of the sealant onto the substrate was peel tested in accordance to ASTM D3330 and percentage of sealant adhesion failure during testing are shown in TABLE 4 below. Examples 30-31 without any adhesion promoter showed low sealant adhesion strength of 0 PIW with 100% adhesion failure. Examples 32-35 with TiB or TiE adhesion promoters showed high adhesion strength of 28 PIW or more with 0% adhesion failure.

TABLE 4

| Ex | Topcoat | Adhesion Promoter | Adhesion Strength | Adhesion Failure |
|---|---|---|---|---|
| 30 | none | none | 0 | 100% |
| 31 | none | none | 0 | 100% |
| 32 | none | TiB | 30.50 | 0% |
| 33 | none | TiB | 28.52 | 0% |
| 34 | none | TiE | 30.45 | 0% |
| 35 | none | TiE | 30.15 | 0% |

While the foregoing is directed to aspects of the present disclosure, other and further aspects of the disclosure may be devised without departing from the basic scope thereof, and the scope thereof is determined by the claims that follow.

What is claimed is:

1. A method of sealing a surface, comprising:
applying a composition to the surface, the composition comprising:
an organic solvent present in an amount of about 95 to about 99.5 volume percent, wherein the organic solvent has a vapor pressure of about 10 mmHg to about 45 mmHg at 20° C.; and
a transition metal alkoxide or a transition metal alkanoate present in an amount of about 0.5 to about 5 volume percent; and
evaporating the organic solvent from the composition applied to the surface to deposit a transition metal oxide onto the surface, followed by removing an excess of the transition metal oxide from the deposited transition metal oxide to form a transition metal oxide layer disposed on the surface, the transition metal oxide layer having a thickness of about 200 nm to about 400 nm; and
applying a sealant over the transition metal oxide layer to form a sealant layer, the sealant layer selected from a group consisting of a polysulfide, a polythioether, a silicone, a polyurethane, and combinations thereof.

2. The method of claim 1, wherein the surface is unsanded.

3. The method of claim 1, wherein the surface is a glossy topcoated surface over an aluminum substrate.

4. The method of claim 1, wherein the surface is a bare surface of a composite substrate.

5. The method of claim 1, wherein the composition is applied to the surface in a form selected from a group consisting of a solution and an aerosol.

6. The method of claim 1, wherein evaporating the organic solvent is performed for a time period of about 0.5 minutes to about 30 minutes.

7. The method of claim 1, wherein the transition metal oxide is formed as the transition metal alkoxide is exposed to air as the organic solvent evaporates from the composition.

8. The method of claim 1, wherein the excess of the transition metal oxide removed leaves a monolayer or more of the transition metal oxide adsorbed onto the surface.

9. The method of claim 1, wherein the sealant layer has a peel strength of about 25 or more pounds per inch of width.

10. The method of claim 1, wherein applying the composition comprises brushing or rolling the composition to remove contaminants from the surface to form a cleaned surface.

11. The method of claim 1, wherein evaporating the organic solvent is performed at ambient conditions.

12. The method of claim 1, wherein the composition comprises the transition metal alkanoate.

13. The method of claim 12, wherein the transition metal alkanoate is titanium ethylhexanoate.

14. The method of claim 1, wherein the composition comprises the transition metal alkoxide.

15. The method of claim 14, wherein the transition metal alkoxide is selected from a group consisting of a transition metal butoxide, a transition metal ethoxide, a transition metal ethylhexyloxide, and combinations thereof.

16. The method of claim 1, wherein the transition metal oxide is selected from a group consisting of a titanium dioxide, a zirconium dioxide, and combinations thereof.

17. The method of claim 1, wherein the organic solvent is selected from a group consisting of isopropyl alcohol, benzyl alcohol, tert-butanol, and combinations thereof.

18. The method of claim 1, wherein removing the excess of the transition metal oxide is performed by wiping the excess of the transition metal oxide from the surface.

19. The method of claim 1, wherein the surface is a surface of a fuel tank.

20. The method of claim 1, wherein the composition is substantially free of acid.

21. The method of claim 1, wherein removing an excess of the transition metal oxide from the deposited transition metal oxide is performed by dry wiping the excess of the transition metal oxide from the deposited transition metal oxide.

\* \* \* \* \*